United States Patent
Millhiser et al.

(10) Patent No.: US 6,244,677 B1
(45) Date of Patent: Jun. 12, 2001

(54) ARRAY AND METHOD FOR STANDARDIZING CARTRIDGE LOCATION WITHIN STORAGE CELLS OF A DATA STORAGE LIBRARY

(75) Inventors: David R. Millhiser, Boulder; Daniel J. Plutt, Superior, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/362,482

(22) Filed: Jul. 28, 1999

(51) Int. Cl.$^7$ ................................................. G11B 23/023
(52) U.S. Cl. ........................................ 312/9.48; 312/9.63
(58) Field of Search ........................... 312/9.1, 9.9, 9.47, 312/9.48, 9.57, 9.63, 350, 333, 319.1; 360/92, 93, 94; 206/307.1, 387.1, 387.15, 387.14; 211/41.12

(56) References Cited

U.S. PATENT DOCUMENTS

| | | | |
|---|---|---|---|
| 4,203,519 | * | 5/1980 | Fujitaki .............................. 206/387.1 |
| 4,707,247 | * | 11/1987 | Savoy ................................ 206/387.1 |
| 4,807,749 | | 2/1989 | Ackeret . |
| 4,850,485 | | 7/1989 | Ishikawa . |
| 5,038,235 | | 8/1991 | Ohzawa et al. . |
| 5,160,027 | | 11/1992 | Wu . |
| 5,184,261 | | 2/1993 | Noguchi . |
| 5,297,675 | | 3/1994 | Martucci . |
| 5,399,004 | * | 3/1995 | Buschle ........................... 312/9.48 X |
| 5,636,752 | * | 6/1997 | Gallagher ........................ 312/350 X |
| 5,692,623 | | 12/1997 | Todor et al. . |
| 5,857,566 | | 1/1999 | Fu . |
| 5,936,795 | | 8/1999 | Theobald et al. . |
| 6,008,964 | * | 12/1999 | Goodknight et al. .................. 360/92 |
| 6,019,230 | * | 2/2000 | Hayashi ........................... 312/9.63 X |

FOREIGN PATENT DOCUMENTS

| | | |
|---|---|---|
| 0 288 165 | 10/1988 | (EP) . |
| 0 407 305 | 1/1991 | (EP) . |
| 0 627 738 | 12/1994 | (EP) . |
| 99 26245 | 5/1999 | (WO) . |

* cited by examiner

Primary Examiner—Janet M. Wilkens
(74) Attorney, Agent, or Firm—Brooks & Kushman P.C.

(57) ABSTRACT

An array and method for standardizing the location of cartridges within a data storage library are provided. The array includes at least one storage cell for receiving at least a portion of a cartridge, where the storage cell includes a first side wall and a second side wall substantially parallel to the first side wall, and the first side wall has a resilient member that is mountable thereon. Upon insertion of a cartridge into the storage cell, the resilient member is operable to engage a first side face of the cartridge and dispose a second side face of the cartridge in contact with the second side wall, defining a reference width position. Depending on the dimensions of the cartridge, either a back abutment or at least one stop extending generally perpendicularly from the first or second side wall preferably engages a back face of the cartridge to limit its depth within the storage cell, such that a reference depth position forward from the storage cell is established. By standardizing the location of cartridges with respect to a reference width location and a reference depth location of each storage cell, the reliability of cartridge access by a robotic arm is greatly improved.

11 Claims, 5 Drawing Sheets

ARRAY AND METHOD FOR STANDARDIZING CARTRIDGE LOCATION WITHIN STORAGE CELLS OF A DATA STORAGE LIBRARY

TECHNICAL FIELD

This invention relates to an array and method for standardizing the location of data cartridges within storage cells of a data storage library.

BACKGROUND ART

A popular device for handling large amounts of information in a data processing system is the data storage library. These libraries store and manage large numbers of data cartridges, typically containing magnetic tape on which data is recorded. A data storage library is composed of arrays of storage cells, each cell being formed to contain a single data cartridge. The arrays each hold a plurality of data cartridges, and each data cartridge has some kind of identifying information, such as a label or bar code. Typically, the arrays surround a robotic arm which has an optical system for selecting cartridges, and is operable to locate a particular storage cell and retrieve and transport a data cartridge therefrom. The cartridges must be positioned within the storage cells in a precise manner if the robotic arm is to grasp them correctly.

Different hardware manufacturers have independently developed data cartridges that are unique to each manufacturer. Accordingly, the owner of a data storage library may wish to use a variety of different cartridge types within a single library system. However, it has traditionally been a problem in library design to accommodate data cartridges of different sizes into the same library enclosure. One approach is to provide a fixed number of storage cells sized for each different type of cartridge within the data storage library. However, this solution is undesirable since each library must be specially customized with fixed numbers of storage cells corresponding to the owner's needs, and those needs may change over time.

If a single size storage cell is used for storing data cartridges of different sizes, the storage cell width and length must be sufficient to allow the widest and longest cartridge to easily be contained therein. However, for data cartridges with substantially smaller dimensions than the storage cell size, misalignment of the cartridges within the storage cells often occur and result in transfer difficulties for the robotic arm. In particular, cartridges having different widths will not be positioned in a standard location within the storage cells. This width variation has typically been addressed by attempting to center the cartridges within the storage cells, however, the centering attempts often leave cartridge labels in skewed positions which the optical system of the robotic arm must resolve with its depth of field capability. The skewed alignment of the cartridges also reduces the reliability of engagement by the robotic arm. Furthermore, cartridges having different lengths will extend forwardly, if at all, from the storage cells at different distances, further reducing the reliability with which the robotic arm can accomplish cartridge transfer.

DISCLOSURE OF INVENTION

Therefore, it is an object of the present invention to provide an array and method for standardizing the location of cartridges within storage cells of a data storage library.

It is another object of the present invention to provide an array and method for standardizing the location of cartridges while accommodating cartridges of different sizes within a single size storage cell.

It is a further object of the present invention to provide an array and method for standardizing the location of cartridges within storage cells by aligning cartridges with respect to a reference width location of each storage cell.

It is a still further object of the present invention to provide an array and method for standardizing the location of cartridges within storage cells by aligning cartridges with respect to a reference depth location of each storage cell.

It is another object of the present invention to provide an array and method for standardizing the location of cartridges within storage cells that aligns cartridges of different sizes without altering the force required by the robotic arm.

Accordingly, an array for standardizing the location of cartridges in a data storage library is provided. The array includes at least one storage cell for receiving at least a portion of a cartridge, where the storage cell includes a first side wall and a second side wall substantially parallel to the first side wall. The first side wall has a resilient member mountable thereon for engaging a first side face of the received cartridge and disposing a second side face of the cartridge in contact with the second side wall.

In a preferred embodiment of the present invention, the resilient member is movable between a fully extended position and a fully displaced position, where in the fully displaced position the resilient member can extend through and beyond the first side wall. Furthermore, the resilient member preferably has a low spring rate such that the force exerted on the cartridge is substantially independent of the width of the cartridge. In further accordance with the preferred embodiment, the storage cell includes a back abutment that is operable to engage a back face of the received cartridge and limit the depth of the cartridge in the storage cell. In addition to the back abutment, the storage cell also preferably includes at least one stop extending generally perpendicularly from one of the first or second side walls, where the at least one stop is operable to engage a back face of the cartridge and limit the depth of the cartridge in the storage cell. Most preferably, a plurality of stops are provided and are located at a common depth along the first or second side wall.

The present invention can also be provided as a data storage library, where the data storage library includes a housing and a plurality of arrays mounted therein. Each array has at least one storage cell for receiving at least a portion of a data cartridge, where the storage cell includes a first side wall and a second side wall substantially parallel to the first side wall. The first side wall includes a resilient member mountable thereon for engaging a first side face of the received cartridge and disposing a second side face of the cartridge in contact with the second side wall. In a preferred embodiment, the data storage library includes an automated, robotic arm located within the housing.

Correspondingly, a method of standardizing the location of cartridges within a data storage library is provided. The method includes providing at least one array having at least one storage cell for receiving at least a portion of a cartridge. According to the method, the storage cell includes a first side wall and a second side wall substantially parallel to the first side wall, where the first side wall has a resilient member mountable thereon. The method further includes inserting a cartridge into the storage cell, and engaging a first side face of the received cartridge with the resilient member. Still further, the method includes disposing a second side face of the cartridge in contact with the second side wall. In a preferred embodiment, the method includes engaging a back face of the received cartridge using at least one stop extending generally perpendicularly from the first or second side wall to limit the depth of the cartridge in the storage cell.

In addition, a method is provided for standardizing the location of at least two differently sized cartridges within a data storage library. The method includes providing at least one array having at least one storage cell for receiving at least a portion of a cartridge, where the storage cell includes a first side wall and a second side wall substantially parallel to the first side wall. In accordance with the method, the first side wall has a resilient member mountable thereon. The method further includes inserting a first cartridge having a first width dimension into the storage cell, then engaging a first side face of the first cartridge with the resilient member in order to dispose a second side face of the first cartridge in contact with the second side wall. Next, the method includes removing the first cartridge from the storage cell and inserting a second cartridge into the storage cell, where the second cartridge has a second width dimension different from the first width dimension. Lastly, the method includes engaging a first side face of the second cartridge with the resilient member in order to dispose a second side face of the second cartridge in contact with the second side wall in substantially the same position as the first cartridge.

In one embodiment of the above method, the first cartridge has a first length dimension and the second cartridge has a second length dimension different from the first length dimension. The method then further includes engaging a back face of the first cartridge using a back abutment to limit the depth of the first cartridge forward from the storage cell, and engaging a back surface of the second cartridge using at least one stop extending generally perpendicularly from the first or second side wall, such that the depth of the second cartridge forward from the storage cell is substantially equal to the depth of the first cartridge.

The above objects and other objects, features, and advantages of the present invention are more readily understood from a review of the attached drawings and the accompanying specification and claims.

BEST MODE FOR CARRYING OUT THE INVENTION

Figure 1:
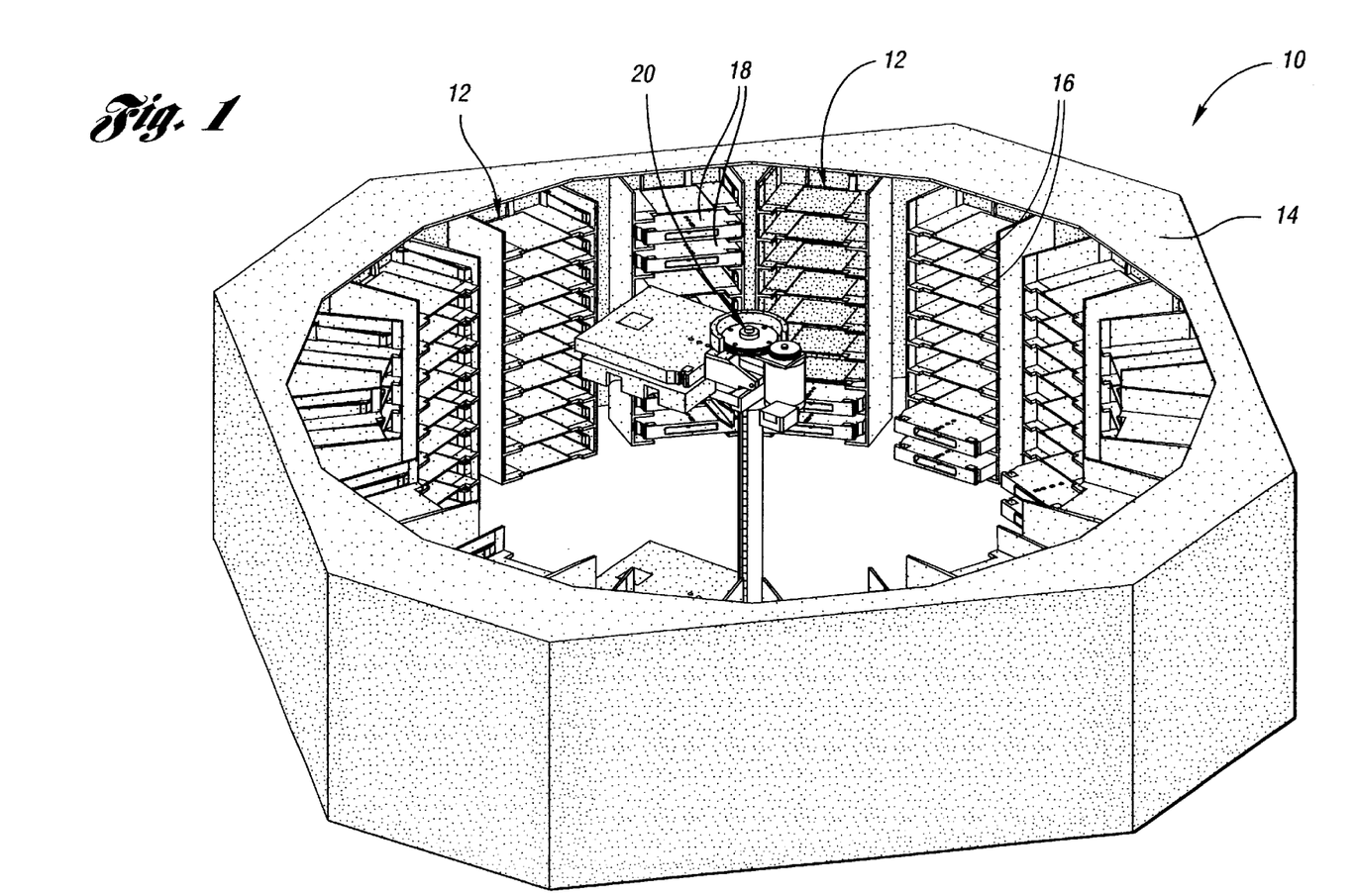
FIG. 1 is a perspective view of a data storage library in accordance with the present invention.

Referring first to FIG. 1, a typical data storage library 10 is shown. Library 10 contains a plurality of storage arrays 12 mounted either permanently or removably within a housing 14. Each array 12 preferably includes a plurality of essentially identical storage cells 16 that are each designed to receive a data cartridge 18 or at least a portion thereof. In a preferred embodiment, arrays 12 are mounted to surround an actuator, such as a robotic arm 20. Preferably, the operation of library 10 is automated and is directed by a processor, such as a host computer (not shown). The processor provides signals to robotic arm 20 to control its motion and operation, and therefore control the handling and storage of cartridges 18 within data storage library 10. The processor also controls the operation of an optional tape drive (not shown) located within data storage library 10. Although housing 14 is depicted herein to be cylindrical, the present invention applies equally well to data storage libraries utilizing other housing structures and storage configurations.

Figure 2:
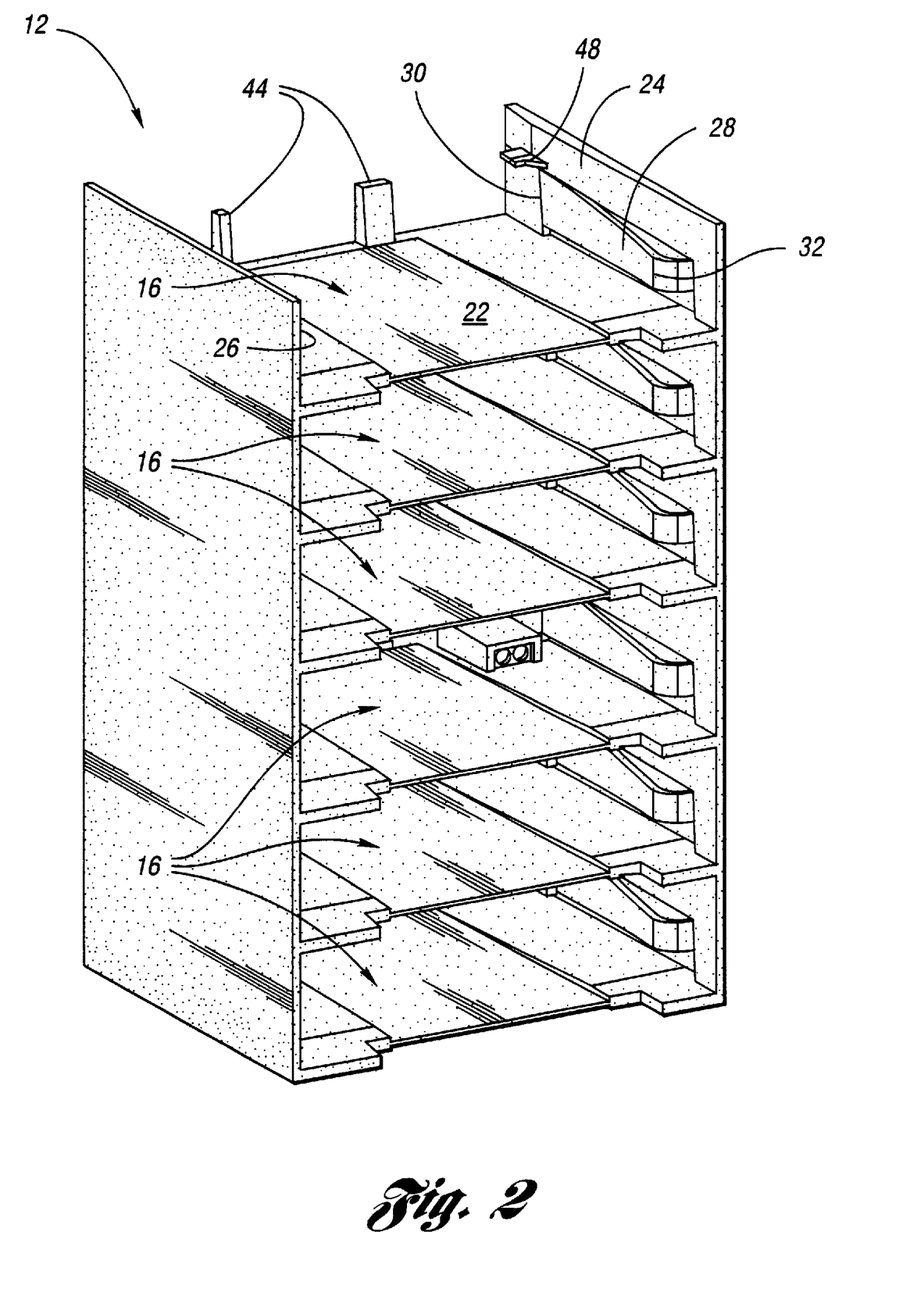
FIG. 2 is a perspective view of an array constructed in accordance with the present invention.

Referring next to FIG. 2, array 12 constructed in accordance with the present invention is shown in greater detail. To ensure reliable access by robotic arm 20, it is desired that the width and depth of each data cartridge 18 received within storage cells 16 of an array 12 be uniform. Therefore, array 12 of the present invention is operable to standardize the location of cartridges 18, regardless of their dimensions. Array 12 can be used to standardize the location of same type cartridges that can have slight variations in dimensions due to design tolerances, as well as different type cartridges with significantly different length and width dimensions. As explained below, array 12 is capable of aligning cartridges 18 with respect to a reference width location and a reference depth location in the storage cells 16.

Figure 3:
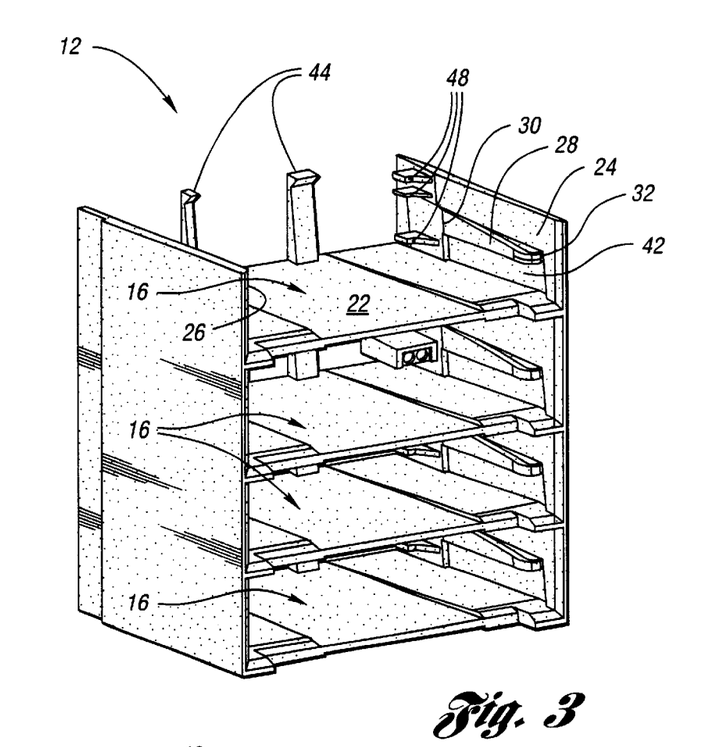
FIG. 3 is a perspective view of a preferred embodiment of the array of the present invention.

As shown in FIGS. 2 and 3, each storage cell 16 includes a generally planar bottom wall 22 that joins a first side wall 24 and a second side wall 26, where first 24 and second 26 side walls have a substantially parallel relationship. In order to align cartridges 18 with respect to a reference width location within each storage cell 16, first side wall 24 includes a resilient member 28, such as a spring element, that is mountable thereon. Resilient member 28 is shown to have a cantilever type design, with a first end 30 affixed to first side wall 24, and a second end 32 extended to engage a cartridge 18. Of course, it is understood that resilient member 28 could be constructed from any material and have any configuration suitable to resiliently engage a received cartridge 18. Advantageously, resilient member 28 operates to align cartridges 18 without requiring a mating engagement with a specific detent or similar feature on the cartridge 18.

Figure 5:
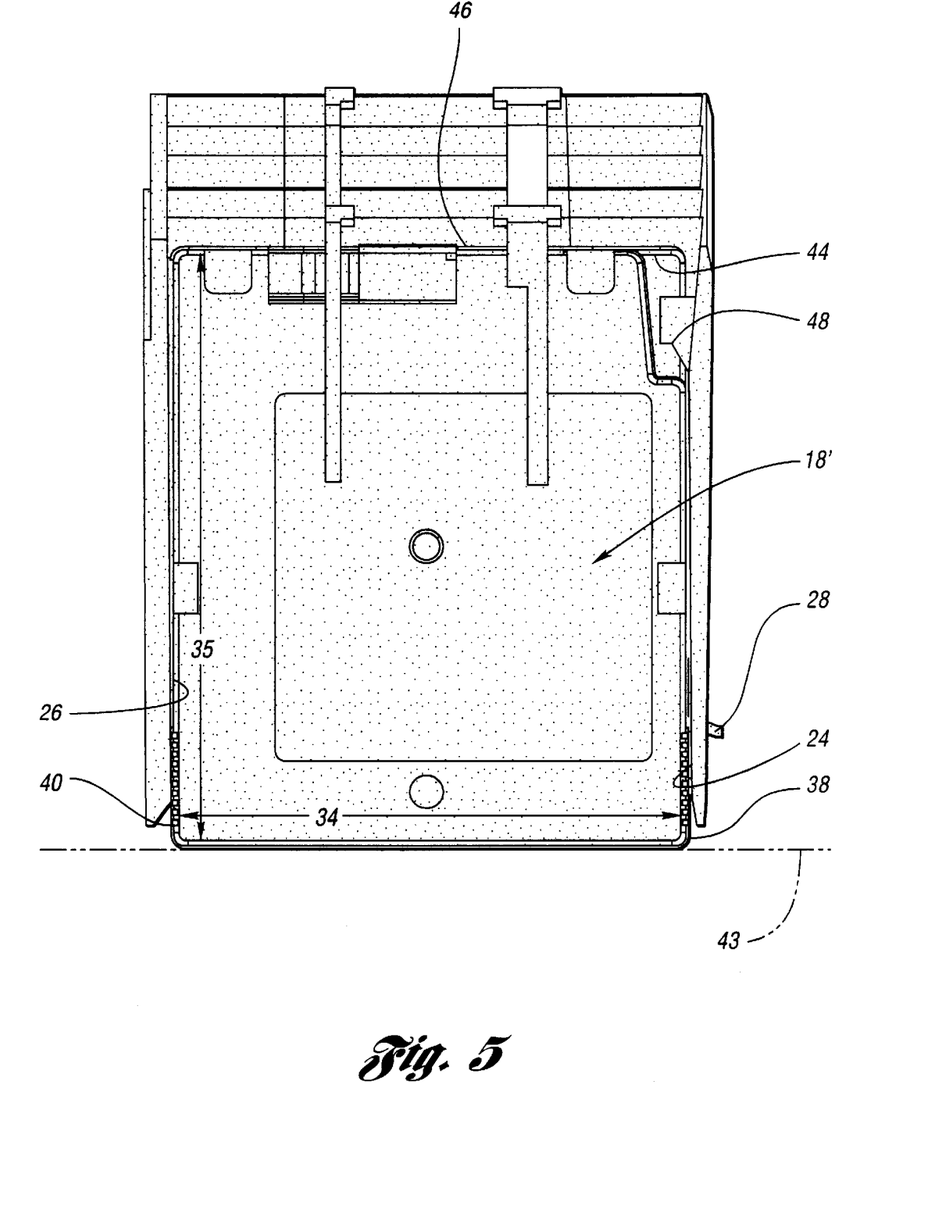
FIG. 5 is a top view of a first type of cartridge stored in a storage cell of the array of FIG. 3.
Figure 6:
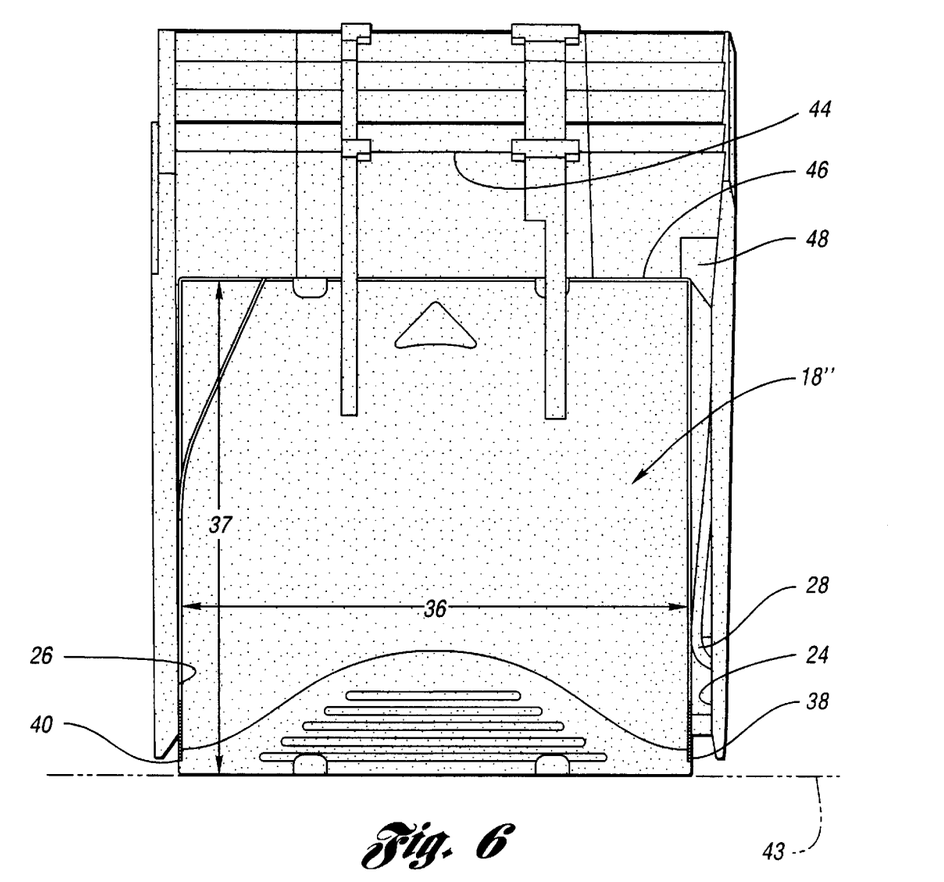
FIG. 6 is a top view of a second type of cartridge stored in a storage cell of the array of FIG. 3.

Using resilient member 28, a reference width position at second side wall 26 can be established regardless of the width of the cartridge 18 held within the storage cell 16. Referring now to FIGS. 5 and 6, two different types of cartridges having different width and length dimensions are shown. More particularly, FIG. 5 shows a first cartridge 18' having a first width dimension 34 and a first length dimension 35, while FIG. 6 shows a second cartridge 18" having a second width dimension 36 that is less than first width dimension 34, and a second length dimension 37 that is less than first length dimension 35. For each cartridge 18', 18", resilient member 28 is operable to engage a first side face 38 of the received cartridge 18', 18" and dispose a second side face 40 of the cartridge 18', 18" in contact with the second side wall 26. Of course, cartridges having width dimensions other than those depicted for cartridges 18', 18" are accommodated equally as well by resilient member 28 of the present invention, providing that their width is not too large to fit within the storage cell 16, nor too small to escape engagement by resilient member 28 entirely.

Figure 4:
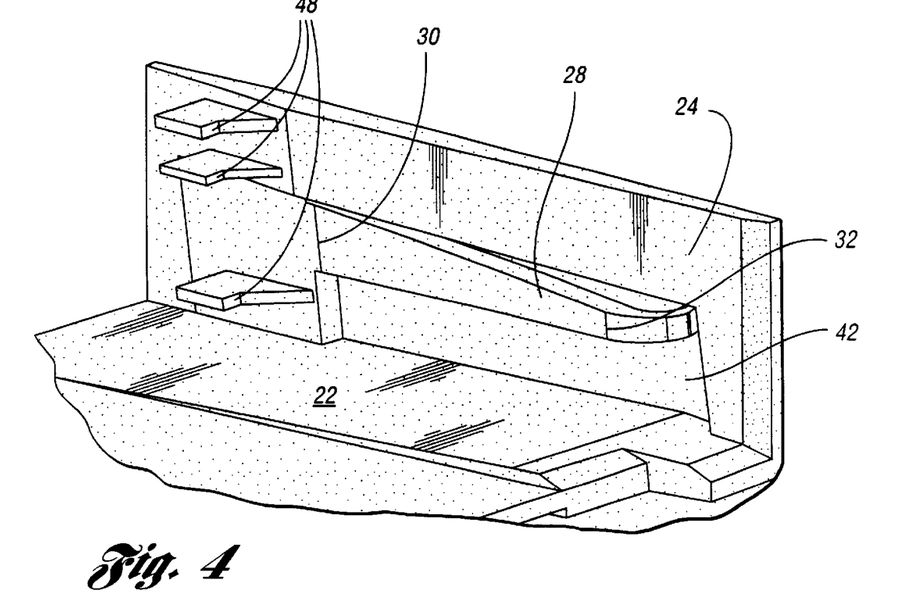
FIG. 4 is an enlarged, cut-away view of a storage cell of the array shown in FIG. 3.

In a preferred embodiment of the present invention, resilient member 28 is mountable within a recess 42 formed in first side wall 24, as best shown in FIGS. 3 and 4. Therefore, resilient member 28 is movable between a fully extended position (FIGS. 2–4) and a fully displaced position (FIG. 5), such as when engaged with cartridge 18'. In its fully displaced position, resilient member 28 is preferably able to extend through and beyond first side wall 24, such that the width of storage cells 16 need not be any larger than the width of the largest cartridge desired to be received therein.

In further accordance with a preferred embodiment of the present invention, resilient member 28 has a low spring rate such that the force exerted on the cartridge 18 by resilient member 28 is substantially independent of the width of the cartridge 18. With this design, a range of cartridge widths can be accommodated while producing only a small variation in the force disposing a cartridge 18 into contact with second side wall 26. Since this force relates directly to the forces required of a robotic arm 20 when inserting and retrieving cartridges 18 from a storage cell 16, use of a low spring rate for resilient member 28 serves to further standardize the manner in which different types of cartridges are accessed by robotic arm 20.

Array 12 of the present invention can be equipped, either exclusively or in combination with resilient member 28, to provide a reference depth location 43, as measured extending forward from storage cell 16, for cartridges 18' and 18" having different length dimensions 35 and 37, respectively. Referring again to FIGS. 2–4, each storage cell 16 preferably includes one or more back abutments 44 that are operable to engage a back face 46 (best shown in FIGS. 5–7) of the received cartridge 18, and therefore limit the depth of the cartridge 18 within the storage cell 16. Alternatively, an entire back wall (not shown) could be provided for each storage cell 16 to serve as a depth limit. In addition to back abutments 44, each storage cell 16 also preferably includes at least one stop 48 extending generally perpendicularly from first side wall 24. Of course, it is understood that stop 48 could alternatively extend from either second side wall 26 or a back wall (not shown). As with back abutments 44, the stop 48 is also able to engage the back face 46 of a cartridge 18 in order to limit its depth within the storage cell 16. Whether back face 46 of cartridge 18 engages back abutment 44 or stop 48 is dependent upon the cartridge length dimension, as explained below.

In order to establish a reference depth 43 of each cartridge forward from the storage cell 16, cartridges 18', 18" having different length dimensions 35, 37 need to penetrate into storage cell 16 different distances. Therefore, stop 48 is used to prevent cartridge 18" having a shorter length dimension 37 from penetrating too far into storage cell 16. However, stop 48 must not interfere with the penetration of cartridge 18' having a longer length dimension 35 into engagement with back abutment 44. Stop 48 can be of any geometry sufficient to accomplish this function, and preferably is constructed to interfit with design features that are unique to cartridges 18' and 18". For example, stop 48 can be constructed such that back face 46 of cartridge 18' can slide underneath stop 48 and into contact with back abutment 44 without contacting stop 48. Of course, stop 48 can be constructed to limit the depth of cartridges having a length dimension different from that of cartridges 18' and 18" depicted herein.

Figure 7:
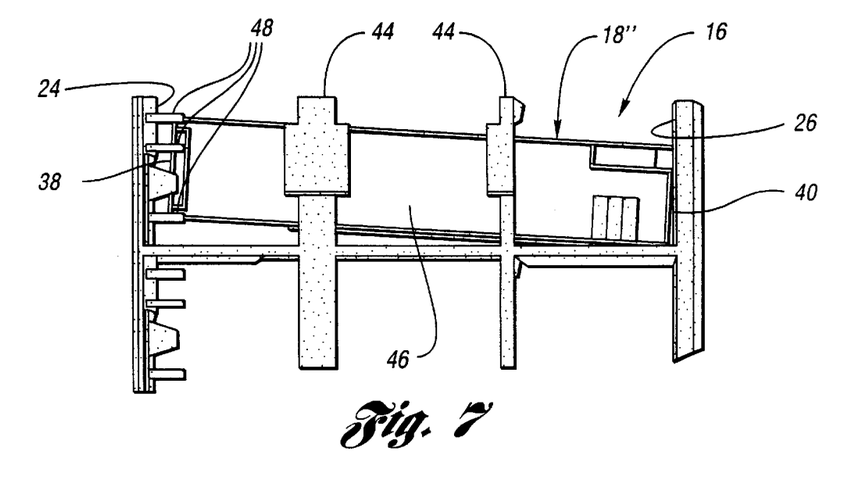
FIG. 7 is a back view of a misaligned cartridge in a storage cell of the array of FIG. 3.

For proper positioning at the reference depth 43, cartridge 18" must not be allowed to penetrate past stop 48, even if the cartridge 18" is misaligned in the storage cell 16. Therefore, as shown in FIGS. 3 and 4, a plurality of stops 48 are preferably provided to create the proper depth positioning for cartridge 18", whether or not it is inserted into the storage cell 16 properly. In a preferred embodiment, stops 48 are located at a common depth along first side wall 24, while still allowing the back face 46 of cartridge 18' to pass therebetween and into engagement with back abutment 44. Referring to FIG. 7, a back view of a storage cell is shown, where a cartridge 18" has been angularly misaligned. If only a single stop 48 is used, cartridge 18" could penetrate too deeply into the storage cell 16 in a skewed fashion. However, as shown, a configuration using multiple stops 48 prevents cartridge 18" from penetrating beyond the intended depth, even if misaligned.

Therefore, the present invention provides an array and method for standardizing the location of differently sized cartridges within a data storage library 10. In particular, array 12 of the present invention positions cartridges 18', 18" at a common reference width and depth location within each storage cell 16. Array 12 accomplishes this standardization using substantially identical storage cells 16, and greatly improves the reliability of cartridge access by robotic arm 20. While particular reference width and depth locations have been defined herein, different width or depth locations are understood to be within the scope of the present invention. Furthermore, it is understood that the present invention extends to additional cartridge designs and dimensions other than those depicted herein.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. An array for standardizing the location of cartridges within a data storage library, the array comprising:
   at least one storage cell for receiving at least a portion of a cartridge, the at least one storage cell including a first side wall and a second side wall substantially parallel to the first side wall;
   a resilient member mountable on the first side wall for engaging a first side face of the received cartridge and disposing a second side face of the cartridge in contact with the second side wall; and
   at least two stops spaced along and extending generally perpendicularly from one of the first and second side walls, wherein the stops are operable to engage a back face of the received cartridge and limit the depth of the cartridge in the storage cell.

2. The array of claim 1, wherein the at least one storage cell further includes a back abutment operable to engage a back face of an other received cartridge and limit the depth of the other cartridge in the storage cell.

3. The array of claim 1, wherein the at least two stops are located at a common depth along one of the first and second side walls.

4. The array of claim 1, wherein the resilient member has a low spring rate for exerting a force on the received cartridge that is substantially independent of the width.

5. A data storage library, comprising:
   a housing;
   a plurality of arrays mounted within the housing, each array having at least one storage cell for receiving at least a portion of a data cartridge, the at least one storage cell including a first side wall and a second side wall substantially parallel to the first side wall;
   a resilient member mountable on the first side wall for engaging a first side face of the received cartridge and disposing a second side face of the cartridge in contact with the second side wall; and at least two stops spaced along and extending generally perpendicularly from one of the first and second side walls, wherein the stops are operable to engage a back face of the received cartridge and limit the depth of the cartridge in the storage cell.

6. The data storage library of claim 5, wherein the at least one storage cell further includes a back abutment operable to engage a back face of an other received cartridge and limit the depth of the other cartridge in the storage cell.

7. The data storage library of claim 5, wherein the at least two stops are located at a common depth along one of the first and second side walls.

8. The data storage library of claim 5, further including an automated, robotic arm located within the housing.

9. The data storage library of claim 5, wherein the resilient member has a low spring rate for exerting a force on the received cartridge that is substantially of the cartridge.

10. A method of standardizing the location of cartridges within a data storage library, the method comprising:

providing at least one array having at least one storage cell for receiving at least a portion of a cartridge, the at least one storage cell including a first side wall and a second side wall substantially parallel to the first side wall, the first side wall including a resilient member mountable thereon, and one of the first and second side walls including at least two stops spaced along and extending generally perpendicularly therefrom;

inserting a cartridge into the at least one storage cell;

engaging a first side face of the received cartridge with the resilient member;

disposing a second side face of the cartridge in contact with the second side wall; and engaging a back face of the received cartridge with the at least two stops to limit the depth of the cartridge in the storage cell.

11. A method of standardizing the location of at least two differently sized cartridges within a data storage library, the method comprising:

providing at least one array having at least one storage cell for receiving at least a portion of a cartridge, the at least one storage cell including a first side wall, a second side wall substantially parallel to the first side wall, and a back abutment, the first side wall including a resilient member mountable thereon, and one of the first and second side walls including at least two stops spaced along and extending generally perpendicularly therefrom;

inserting a first cartridge having a first width and length dimension into the storage cell;

engaging a first side face of the first cartridge with the resilient member in order to dispose a second side face of the first cartridge in contact with the second side wall;

engaging a back face of the first cartridge with the back abutment to limit the depth of the first cartridge in the storage cell;

removing the first cartridge from the storage cell;

inserting a second cartridge into the storage cell, the second cartridge having a second width dimension different from the first width dimension and a second length dimension different from the first length dimension;

engaging a first side face of the second cartridge with the resilient member in order to dispose a second side face of the second cartridge in contact with the second side wall in substantially the same position as the first cartridge; and engage a back face of the second cartridge with the at least two stops to limit the depth of the second cartridge in the storage cell, such that the position of the second cartridge forward from the storage cell is substantially equal to the position of the first cartridge forward from the storage cell.

* * * * *

UNITED STATES PATENT AND TRADEMARK OFFICE
CERTIFICATE OF CORRECTION

PATENT NO. : 6,244,677 B1
DATED : June 12, 2001
INVENTOR(S) : David R. Millhiser, Daniel J. Plutt It is certified that error appears in the above-identified patent and that said Letters Patent is hereby corrected as shown below:

Column 6, claim 4,
Line 57, after "width" insert -- of the cartridge --.

Column 7, claim 9,
Line 19, after "substantially" insert -- independent of the width --.

Column 8, claim 11,
Line 30, delete "engage" and insert -- engaging --.

Signed and Sealed this

Twelfth Day of March, 2002

Attest:

Attesting Officer

JAMES E. ROGAN
Director of the United States Patent and Trademark Office